Nov. 29, 1949 W. S. LUNDAHL 2,489,427
MODEL OF NERVOUS SYSTEM OF VERTEBRATES
Filed June 24, 1948 2 Sheets-Sheet 1
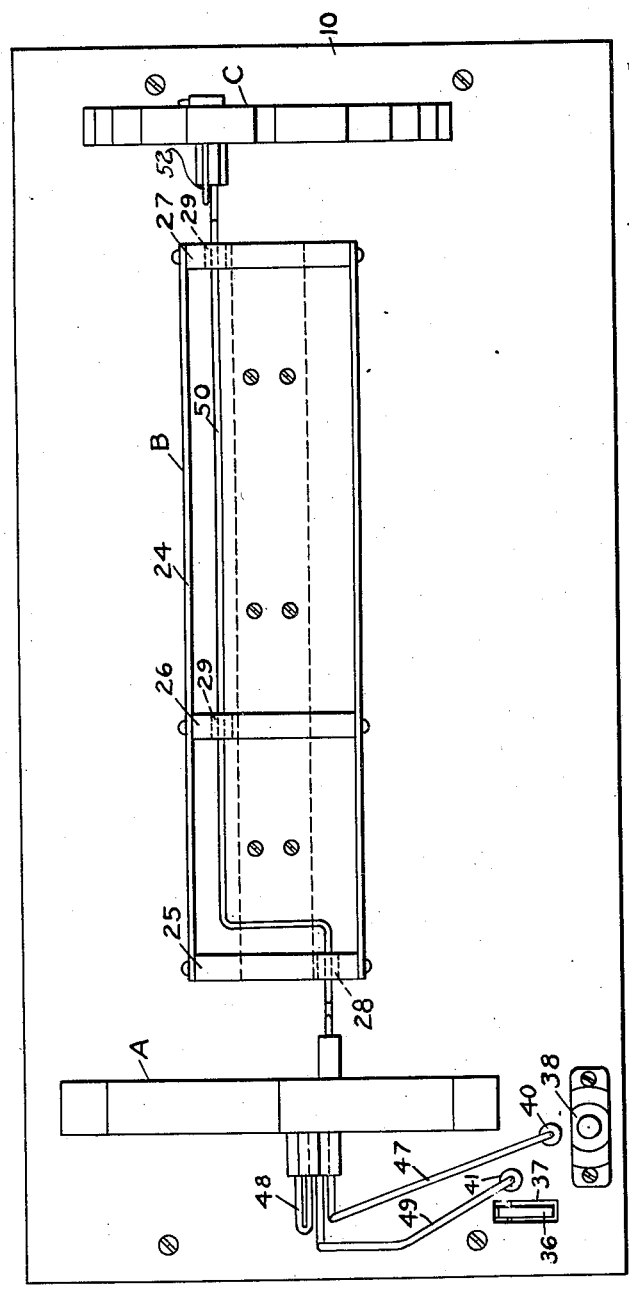
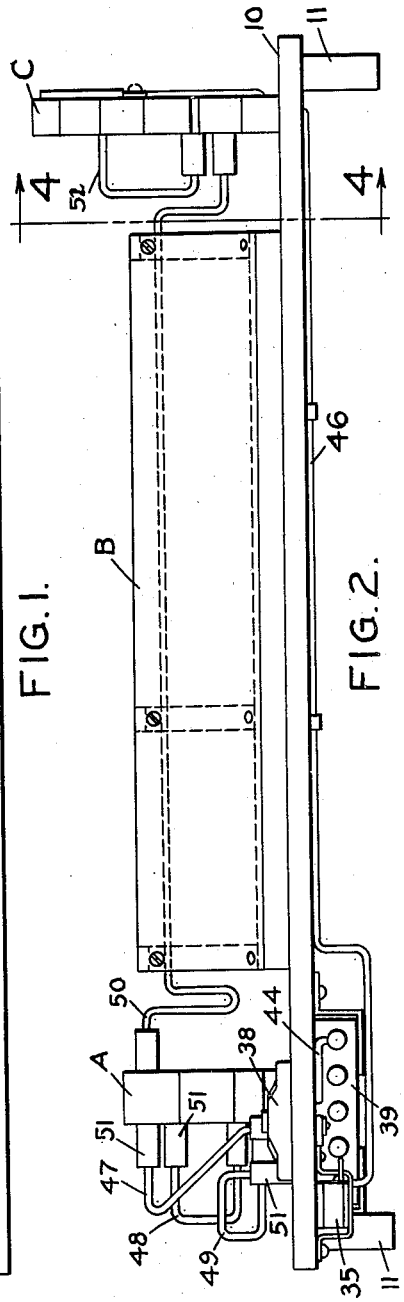
INVENTOR.
Walter S. Lundahl
ATTORNEY.

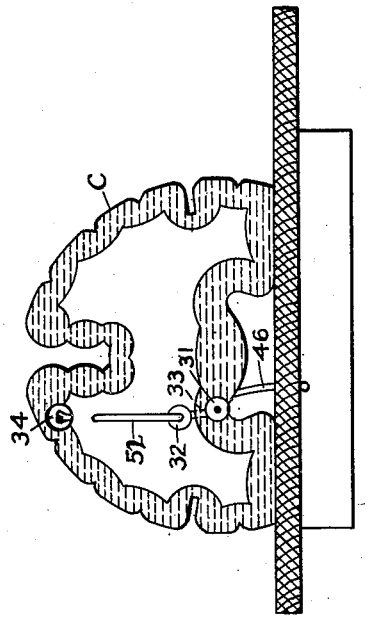
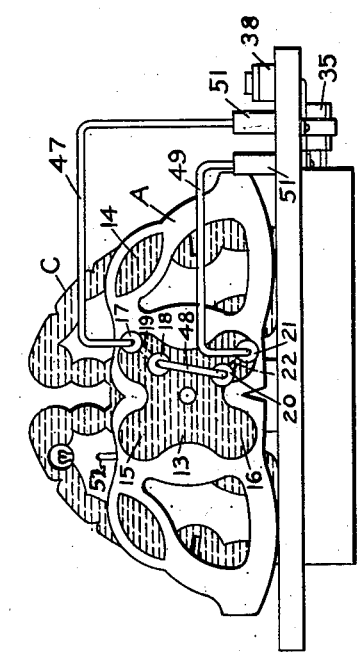
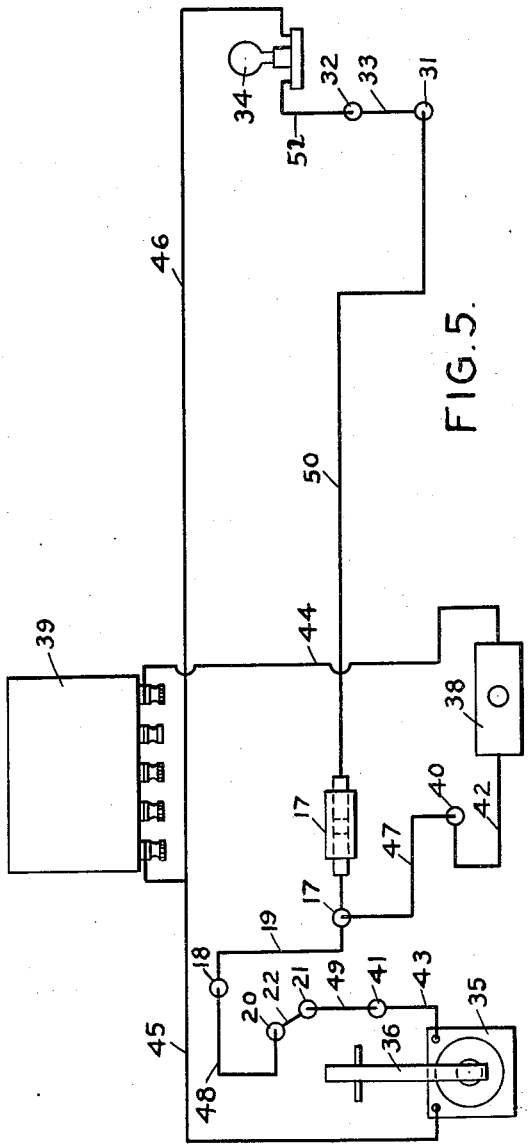
INVENTOR.
Walter S. Lundahl

Patented Nov. 29, 1949

2,489,427

UNITED STATES PATENT OFFICE 2,489,427

MODEL OF NERVOUS SYSTEM OF VERTEBRATES

Walter S. Lundahl, East Lansing, Mich., assignor to The State Board of Agriculture, East Lansing, Mich., a corporation of Michigan Application June 24, 1948, Serial No. 34,855

4 Claims. (Cl. 35—17)

This invention relates to teaching aids, and more particularly to models for demonstrating certain reactions in the nervous system of vertebrates.

The structure and function of the nervous system of vertebrates are usually difficult for the average student to understand. Even such a relatively simple problem as the tracing of a reflex arc is difficult to explain clearly to the student. The present invention is designed to assist in the explanation of the nervous system by demonstrating in a concrete manner the relation and action of the various components of the nervous system.

The principal object of the present invention is to provide a simple model of the principal components of the nervous system for demonstrating the action of the latter.

Another object is to provide an electrically operated device of the above character, the principal components of which can be assembled by the student, thereby combining visual learning with manual learning.

These objects, as well as others ancillary thereto, will appear in the following specification, when read in connection with the accompanying drawings, wherein:

Figure 1 is a plan view of a model embodying the present invention;

Figure 2 is a side elevational view thereof;

Figure 3 is an end elevational view taken from the left hand end of the model as viewed in Figure 1;

Figure 4 is a cross-sectional view taken on substantially the line 4—4 of Figure 2; and Figure 5 is a circuit diagram of the invention.

The model comprises what may be termed a connector panel which represents certain portions of the body structure of a vertebrate, such as a human being; an electrically energized device for indicating a reflex muscular twitch; another electrically energized device for indicating a sensory perception in the brain; and a plurality of electrical conductors which can be connected together and which represent various portions of the nervous system.

The connector panel consists of a base 10 and three units A, B and C representing respectively a section of the lower spine, a portion of the spinal cord, and a section of the brain. The base 10 is preferably a flat wooden board or plastic panel supported on suitable legs 11. Mounted on the base is unit A which comprises an upright block of wood or plastic which is shaped to conform to a cross-section of the spine. On the unit A is painted a representation 13 of the spinal cord and a representation of the spinal ganglia 14. The representation of the spinal cord 13 may be labelled to indicate the dorsal root portion 15 and the ventral root portion 16. In the dorsal root portion 15 are two tubular sockets 17 and 18 which are permanently connected together electrically by a conductor 19 representing a synapse. The sockets 17 and 18 are adapted to receive suitable plugs attached to electrical conductors which will be more fully described presently. Socket 17 extends completely through the upright to provide plug receiving openings at both ends.

In the ventral root portion of the representation of the spinal cord are two sockets 20 and 21 similar to socket 18. These sockets are permanently connected by an electrical conductor 22 representing another synapse.

The second unit B represents a longitudinal portion of the spinal cord without the outgoing and incoming nerves. This unit may take a variety of forms, but in the present form of the invention it is composed of a strip of metal 24 bent into roughly a semi-cylindrical shape and provided with semicircular partitions 25, 26 and 27. These partitions may be painted white with each partition having thereon a representation of the spinal cord painted gray. The partition 25 is provided with an opening 28 therethrough on the same side thereof as the socket 17. Partitions 26 and 27 are provided with openings 29 extending therethrough at the side remote from the opening 28. The entire unit B is suitably fastened to the base 10.

The third unit C is another block of wood or plastic, shaped to conform to a section of the brain. Preferably the unit C is painted white and gray, as shown in the drawings, to designate the white matter and gray matter of the brain. In the base portion of the representation of the brain is a socket 31. Another socket 32 is located in the base portion of the brain adjacent the socket 31, and the two are permanently connected by conductor 33 representing a synapse.

A small electric light bulb 34 is mounted in the unit C in the section thereof which represents the cortex of the brain. This light bulb may be mounted in a suitable opening bored in the unit C.

An electrically energized device for indicating a muscle twitch consists of a small electro-magnet 35 preferably mounted beneath the base 10 adjacent to unit A. A bar of magnetic material 36 is pivoted intermediate its ends on the base 10 with one end thereof located adjacent the electromagnet 35. Preferably this latter end protrudes through an opening 37 cut in the base 10 so that the bar 36 may be visible from the base. The other end of the bar 36 acts as a counter-weight and normally holds the bar away from the electro-magnet.

A switch 38, which may be a simple push button switch, is mounted on the base in any suitable position. A source of current, which may take the form of a three cell battery 39, is also connected to the base.

Two sockets 40 and 41, similar to the sockets previously described, are secured to the base 10 in the position indicated in Figure 1. The socket 40 is connected by a conductor 42 to one terminal of the switch 38. The other socket 41 is connected by a conductor 43 to one terminal of the electromagnet 35.

The various parts described above are connected as shown in the circuit diagram of Figure 5. In addition to the conductors 42 and 43, the switch 38 and electro-magnet 35 are connected to the battery 39 by permanent connections 44 and 45 respectively. Another permanent connection is made to one terminal of the light bulb 34 by means of the conductor 46.

The socket 40 is connected to the left hand end of the socket 17 (as viewed in Figures 1 and 2) by means of a conductor 47. The conductor 47 is an insulated wire provided at its end with phone tips 51 or similar devices which plug into the sockets 40 and 17. The conductor 47 represents a sensory neuron. It is visible from above the base 10. The socket 18 is connected to socket 20 by another removable resistance conductor 48 which represents a connecting neuron extending from the dorsal root to the ventral root. The socket 21 is connected to the socket 41 by another removable conductor 49 representing a motor neuron connecting the ventral root to a muscle (represented by the electromagnet 35 and bar 36).

The connections just described, together with the permanent connections between the battery 39, switch 38 and electro-magnet 35, constitute the reflex arc portion of the nervous system.

The right hand end of the socket 17 is connected by a conductor 50 to the socket 31 in the unit C. The conductor 50 represents a sensory neuron to the brain. This conductor passes through the opening 28 in the partition 25 of unit B and through the openings 29 in the partitions 26 and 27 of that unit. It will be noted that after the conductor 50 passes through the opening 28 it crosses to the other side of the unit B which represents the spine, and when it finally is connected to the brain unit C it communicates with the left side thereof. This is to indicate that the left side of the brain controls the right side of the trunk and limbs.

The conductor 33 mentioned previously, and which indicates a synapse, connects the sockets 31 and 32, and the socket 32 is connected to one side of the light bulb 34 by means of a conductor 52 which indicates a cortical neuron.

It will be seen that the circuit of the light bulb 34 is in parallel with the circuit of the electro-magnet 35 so that when all connections are made and the switch 38 is closed the light 34 will be energized, as will the electro-magnet 35. This shows that upon the closing of the switch 38 the reflex circuit of a muscle is completed causing a muscular twitch, while at the same time a sensory perception is registered on the brain.

If either the conductor 50 or the conductor 52 is disconnected at one end, the reflex arc, including the electro-magnet 35, will be energized upon the closing of the switch 38, but no sensory perception will be transmitted to the brain.

It is desirable in constructing the model of the nervous system that different colored wires be utilized for the different types of neurons. Thus, the sensory neurons 47 and 50 may be red, the connecting neuron 48 may be yellow, the motor neurons 43 and 45 may be blue, and the cortical neuron 52 may be black. Other color schemes, of course, may be utilized.

It will be seen from the foregoing description that the present invention not only illustrates in a concrete manner what occurs in the nervous system when certain types of stimuli are applied to the body, but also teaches the tracing of the reflex circuit and sensory perception circuit. The student is required to properly connect the various parts by means of the removable conductors which indicate the different types of neurons.

The scope of the invention is indicated in the appended claims.

I claim:

1. A device for use in demonstrating reflex action of the nervous system of vertebrates comprising a connector panel having delineated thereon the cross-section of a spinal cord and the cross-section of a brain, said spinal cord section having a dorsal root portion and a ventral root portion, said brain section having a base portion and a cortex portion, a first pair of electrically coupled terminals mounted on said panel in said dorsal root portion, a second pair of electrically coupled terminals mounted on said panel in said ventral root portion, a third pair of terminals mounted on said panel in said base portion and cortex portion respectively, a source of current, a circuit closer mounted on said panel, an electrically energized indicator for representing a reflex muscular movement mounted on said panel adjacent said spinal cord section, a second electrically energized indicator mounted on said panel adjacent said brain section, conductors connecting said first and second pairs of terminals, said first indicator, source of current and circuit closer in series, and conductors connecting said second pair of terminals, said second indicator, said source of current and said circuit closer in series, the conductors which are attached to the terminals being removably connected thereto.

2. A device for use in demonstrating reflex action of the nervous system of vertebrates comprising a base, a pair of uprights formed from insulating material and mounted on said base, said uprights having delineated thereon representations of a cross-section of a spinal cord and a section of a brain respectively, electrical terminals mounted on the uprights in the portions thereof representing said sections, an electrically energized indicator for representing a muscular twitch mounted on said base, an electrically energized indicator for representing a sensory perception on the brain mounted on said base, a source of electric current and a switch connected to said base, and electrical conductors connecting said respective indicators in parallel with each other and in circuit with said source of current and said switch, certain of said conductors being removably attached to said terminals.

3. A device for use in demonstrating reflex action of the nervous system of vertebrates comprising a base, a pair of uprights formed from insulating material and mounted on said base, one of said uprights having delineated thereon a representation of a cross-section of a spinal cord, the other upright having delineated thereon a representation of a section of a brain, a pair of electrical terminals mounted in the dorsal root portion of the spinal cord section connected by a conductor representing a synapse, a second pair of electrical terminals mounted in the ventral root portion of the spinal cord section and connected together by a conductor representing a synapse, an electrical conductor removably connected to one terminal of each of said pairs of terminals, an electrically energized indicator for representing a muscle twitch mounted on said base, an electrically energized indicator for representing sensory perception in the brain mounted on said base, a source of current and a switch mounted on said base, a conductor connecting one terminal of said switch to the other terminal of said dorsal root pair of terminals, a conductor connecting the other terminal of said ventral root pair of terminals to one terminal of said first mentioned indicator, a conductor connecting one terminal of said dorsal root pair of terminals to said second named indicator, and conductors connecting said first and second indicators in parallel with each other and in circuit with said switch and source of current.

4. A device for use in demonstrating reflex action of the nervous system of vertebrates comprising a connector panel having delineated thereon representations of a cross-section of a spinal cord and a cross-section of a brain respectively, electrical terminals mounted on said panel in the portions thereof representing said sections, an electrically energized indicator for representing the muscular twitch mounted on said panel, an electrically energized indicator representing a sensory perception on the brain mounted on the panel, a source of electric current and a switch mounted on said panel, and electrical conductors connecting said respective indicators in parallel with each other and in circuit with said source of current and said switch, certain of said conductors being removably attached to said terminals.

WALTER S. LUNDAHL.

REFERENCES CITED

The following references are of record in the file of this patent:

UNITED STATES PATENTS

| Number | Name | Date |
| --- | --- | --- |
| 1,343,141 | Kenagy | June 8, 1920 |
| 2,196,298 | Garrison | Apr. 9, 1940 |
| 2,207,153 | Judovich | July 9, 1940 |